Sept. 12, 1961  R. KORPMAN  2,999,769
PRESSURE-SENSITIVE ADHESIVE TAPE EMPLOYING ADHESIVE
CONTAINING CURABLE POLYYMER, A LIQUID TACKIFIER
AND ALDEHYDE RESIN CURING AGENT
Filed Jan. 14, 1960
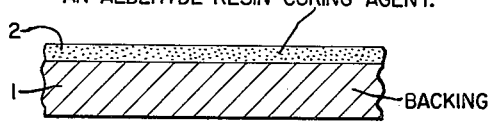
INVENTOR.
RALF KORPMAN
BY
Morgan, Finnegan, Durham & Pine
ATTORNEY

Patent text begins

2,999,769
PRESSURE-SENSITIVE ADHESIVE TAPE EMPLOYING ADHESIVE CONTAINING CURABLE POLYMER, A LIQUID TACKIFIER AND ALDEHYDE RESIN CURING AGENT
Ralf Korpman, East Brunswick, N.J., assignor to Johnson & Johnson, a corporation of New Jersey
Filed Jan. 14, 1960, Ser. No. 2,450
13 Claims. (Cl. 117—122)

This invention relates to adhesive compositions and, more particularly, relates to normally tacky and pressure sensitive adhesive compositions having improved characteristics.

Conventionally normally tacky and pressure-sensitive adhesives are compounded from a composition including an elastomeric component, which is usually a natural or synthetic component compatible with the rubber and adapted to impart tack to the adhesive composition, together with suitable amounts of various types of additives such as conventional fillers, antioxidants, etc. The elastomeric component, tackifying resin, and fillers, when used, are proportioned to obtain in the adhesive properties of high internal strength and cohesiveness and high adhesiveness. The high cohesiveness characteristic is required in order to prevent splitting of the adhesive and offset from its carrier or backing in the case of a pressure-sensitive tape including the adhesive, to the surface to which it is applied, which would render the composition unsuitable for its intended use. The adhesiveness of the composition must be such that good adherence of the composition to the surface to which it is applied is secured.

The internal strength or cohesiveness of such a composition is characterized by the resistance of the adhesive to splitting when two laminae secured thereby are separated. For pressure-sensitive adhesive tapes it is required that the adhesive have an internal strength or cohesiveness sufficient to prevent the forces of adhesion from splitting the adhesive or causing portions of the adhesive to offset to the surface to which it is applied, or to an underlying ply of the tape when in roll form, when removed therefrom. The internal strength of the adhesive is normally indicated by a measurement of the plasticity of the adhesive, determined by compressing a two-gram sample under a fixed load for a period of time and measuring its thickness, usually in millimeters, at that time. Higher plasticity values are considered indicative of high cohesiveness in the mass. More comprehensive data may be obtained from the slope of the curve of sample thickness versus time under compression.

The adhesiveness of such a composition can be considered threefold in characteristics. In the first instance, the adhesiveness of such a pressure-sensitive composition can be related to the ability of the adhesive to secure itself quickly to the surface to which it is applied when little or no pressure is used. This characteristic can be determined by a procedure which involves touching the adhesive surface to a loop of tape to a suitable surface and measuring the force required to immediately remove the tape from the surface. Such adhesiveness is conventionally expressed as "tack" or "quick stick" in units of grams per unit width of tape. The adhesiveness may also be expressed as the resistance of the adhesive and the tape formed therewith to removal of a strip thereof from the surface to which it is applied by a fixed pressure, by means of a force operating on the end of the strip to peel it from the surface at a constant speed. This characteristic of the adhesive may be defined as its "adhesion" or "peel adhesion" and is expressed in units of ounces per unit width of tape. The adhesiveness can also be expressed as the characteristic of the adhesive to resist removal of the tape from a surface to which it is applied when subjected to a static load which tends to sheer the adhesive mass. In conventional test procedures, this characteristic of a pressure-sensitive adhesive is often determined by suspending a fixed weight from an end of a length of pressure-sensitive tape, a fixed area of the other end of which is adhered to a suitable surface. The weight is suspended in a manner which exerts a sheering force upon the adhesive at a suitable removal angle as, for example, 0°, 20° 90°, etc., this angle being that through which the adhesive is bent away from itself. The length of time until the weight drops is taken as an index of an adhesiveness characteristic of the adhesive mass under test and its resistance to shear, and this characteristic is defined as the "hold" characteristic of the adhesive. It is recognized that there is some relation between the internal strength characteristic of an adhesive and its adhesive characteristics, particularly, its hold characteristics. Increased internal strength is generally recognized to have associated with it a related increase in the hold power of an adhesive. Additionally, there is recognized a relation between the peel adhesion and hold characteristic of such a composition with changes in one normally indicative of a similar change in the other. It is also generally recognized that the hold characteristic and tack or "quick stick" characteristic are counter-acting properties. That is, the enhancement of one to a great extent, when accomplished, is normally at the expense of the other.

The invention is based upon the discovery that pressure-sensitive adhesives formed of elastomeric polymers and compatible liquid tackifying resins have improved characteristics generally, and, particularly, greatly improved "quick-stick" characteristics. It has been found that the use of liquid resin tackifiers rather than conventional solid resin tackifiers give improved "quick-stick" or "wet grab" to the adhesive mass for a given degree of cohesive strength. In addition the adhesive mass of this invention is cured with phenolic resin to give cohesive strength, resistance to roll deformation, high temperature resistance and improved age resistance.

Accordingly, it is an object of this invention to provide an adhesive having improved characteristics.

It is an additional object of this invention to provide a normally tacky and pressure-sensitive adhesive having improved characteristics of internal strength and adhesion and greatly improved characteristics of "quick-stick."

It is a further object of this invention to provide a normally tacky and pressure-sensitive adhesive having satisfactory cohesive strength, resistance to roll deformation, high temperature resistance, improved age resistance, satisfactory hold characteristics and high quick-stick characteristics.

Another object of this invention is to provide novel normally tacky and pressure-sensitive tapes utilizing novel adhesive compositions having the attributes set forth in the foregoing objects.

In accordance with this invention, pressure-sensitive adhesives having improved characteristics are formed by adding together an elastomeric polymer and liquid tackifier compatible with the elastomeric polymer and adapted to render the composition tacky and pressure-sensitive at normal temperatures. In order to render the elastomer of the resulting composition when heated substantially insoluble in conventional aromatic and aliphatic organic solvents, such as toluene and heptane, the adhesive is cured. Examples of suitable curing agents for this purpose are aldehyde curing agents described hereinafter in detail. In forming novel normally tacky and pressure-sensitive tapes, the adhesive mass is coated on the backing in any suitable manner, such as by solvent coating or calendering, after which it is cured to improve its cohesive strength, resistance to roll deformation, high temperature resistance and age resistance. As indicated heretofore, the use of liquid tackifiers imparts a high degree of quick-stick to the adhesive which is substantially retained in the curing operation.

Any curable elastomeric polymer conventionally used in normally tacky and pressure-sensitive adhesives may be employed in accordance with this invention. Examples of suitable elastomeric polymers for this purpose are isoprene polymers, such as natural rubber, reclaimed rubber, dienestyrene homolog copolymers, such as butadiene-styrene copolymers containing at least 50% and preferably, at least 70% butadiene, polybutadiene; isobutylene-diene copolymers, such as butyl rubber, an isobutylene-isoprene copolymer; and chloroprene polymers.

The liquid tackifier to be useful in accordance with this invention must impart normally tacky and pressure-sensitive characteristics to the adhesive and be compatible with the elastomeric polymer. It has been found that liquid tackifiers having a melting point below about 25° C. by the known ball and ring method for determining melting points possess the required characteristics. Examples of suitable tackifying resins for the purpose of this invention are liquid polyisobutylene resins, such as "Vistac No. 1," a broken chain butene resin, manufactured and sold under that trade name by Advance Solvents & Chem. Corp., New York, N.Y.; liquid polyterpene resins, such as those polymers of beta pinene manufactured by Pennsylvania Industrial Chemical Corp., Clairton, Pennsylvania, and sold under the trade name "Piccolyte S.10" and "Piccolyte S.25"; liquid paracoumarone-indene resins; liquid rosin derivatives such as the triethylene glycol ester of hydrogenated rosins manufactured by Hercules Powder Co., Wilmington, Delaware, and sold under the trade name "Staybelite Ester No. 3," hydrogenated methyl ester of rosin, manufactured by Hercules Powder Co., and sold under the trade name "Hercolyn," technical hydroabietyl alcohol manufactured by Hercules Powder Co., and sold under the trade name "Abitol," and methyl ester of rosin manufactured by Hercules Powder Co. and sold under the trade name "Abalyn"; liquid petroleum polymers such as the petroleum polymer manufactured by Pan American Chemicals Division, Texas City, Texas, and sold under the trade name "Panapol"; and, liquid styrene derivatives such as polymethyl styrene manufactured by Dow Chemical Co. and sold under the trade name "Dow-V-9."

Particularly useful as liquid tackifiers in accordance with this invention are those which are reactive. Such reactive tackifiers give an adhesive having unique hold characteristics. A possible mechanism for the improved hold characteristics is that a reaction takes place between the elastomeric polymer E, curing agent C and a liquid reactive tackifier T. This might result in linkage between E and C, T and C and T and E which can then be combined to any number of combinations.

Examples of suitable compatible, liquid reactive tackifiers are the liquid glycol esters of dehydroabietic acid such, for example, as diethylene glycol ester of dehydroabietic acid, triethylene glycol ester of dehydroabietic acid, neopentyl glycol ester of dehydroabietic acid and propyl glycol ester of dehydroabietic acid.

If so desired, mixtures of two or more liquid tackifiers may be used. As indicated heretofore, the liquid tackifier is in an amount sufficient to impart normally tacky and pressure-sensitive characteristics to the adhesive mass. In general, the liquid tackifier is in an amount from 50 to 500 parts per 100 parts of the elastomeric polymer. When the liquid tackifier is a reactive tackifier it may be used in smaller amounts than when the liquid tackifier is non-reactive such, for example, as about 25 parts to about 350 parts, and, preferably from about 90 parts to about 150 parts per 100 parts elastomeric polymer. If the tackifier is in an amount less than the above-indicated minimum, the adhesive exhibits insufficient tack, while if the tackifier is in an amount greater than the above-indicated maximum, insufficient cohesive strength of the mass is obtained.

Any phenol-aldehyde resin reactive with and soluble in the elastomeric polymer may be used as the curing agent in accordance with this invention. Examples of such phenolic curing agents are liquid and solid para-substituted phenol-aldehyde resins. These resins may be formed by reacting a para-substituted phenol, such as para butyl phenol, para tertiary amyl phenol, para phenyl phenol, para octyl phenol, para nonyl phenol with formaldehyde, the latter being in excess of equimolecular amount and preferably from 1.2 to 2 moles formaldehyde per mole of phenol. This reaction is performed in the presence of an alkaline catalyst. Further details of such resins can be found in U.S. Patents 1,800,295; 1,800,296; 1,996,069; 2,058,797; 2,079,210; 2,123,898; 2,139,081; 2,101,944; 2,112,022 and 2,211,048. An example of a suitable phenol-aldehyde resin is an octyl phenol-formaldehyde resin manufactured by Rohm and Haas and sold under the trade name "Amberol ST 137."

In addition to the above-described phenolic curing agents, other phenol-aldehyde resins which may be used include 3,5 xylenol-aldehyde condensed resins. The preferred phenolic curing resins are those having a greater solubility in the elastomer which results in better reactivity with the elastomer.

In general, the aldehyde resin curing agent is in an amount from about 5 parts to about 75 parts per 100 parts of the elastomeric polymer. If the curing agent is in an amount less than the above-indicated minimum an insufficient cure of the elastomer results. The maximum amount of curing agent present is limited by the solubility of the curing agent in the elastomer. In order that the adhesive may have adequate quick-stick characteristics, the liquid tackifier should be in an amount at least equal to that of the phenolic curing agent.

Examples of other suitable aldehyde resin curing agents are the oil soluble, reactive urea-formaldehyde resins such, for example, as that manufactured by Monsanto Chemical Company and sold under the trade name "Resimene U-920." Also useful as curing agents are melamine-formaldehyde resins such, for example, as that manufactured by American Cyanamid Company, and sold under the trade name "Melmac 243–3."

As will be understood by those skilled in the field, the temperature for curing will vary depending upon many factors, such as (1) the reactivity of the particular curing agent used, (2) the time permitted for curing, (3) the particular elastomer being cured, and (4) the temperature at which the backing to which the adhesive is attached would be harmed. As the temperature of curing is increased, the required time for curing is decreased. For example, an adhesive containing 100 parts of natural rubber, 10 parts para tertiary octyl phenol-formaldehyde curing agent and 150 parts of Piccolyte S–10 is adequately cured when heated for one and one-half minutes at 375° C. or three minutes at 350° C. In like manner, the time required for curing becomes less as the amount of curing agent is increased. For example, in the above referred to specific composition, if 40 parts of curing agent is substituted for 10 parts, the time of curing at 375° F. is reduced from one and one-half minutes to one half minute and at 350° F. from 3.0 minutes to seven tenths of a minute. Moreover, as indicated heretofore, the temperature of curing will vary depending upon the particular elastomer that is to be cured. For example, some chloroprene polymers may be cured at temperatures normally encountered in applying the adhesive composition to the backing, e.g. 250° F. In order to obtain comparable curing results with elastomeric polymers such as natural rubber for the same curing period much higher curing temperatures must be employed, e.g. 350° F. In general, the curing temperatures employed in accordance with this invention are in the range of 250° F. to 425° F.

When the liquid tackifier employed is reactive, a shorter time is required for curing than when the liquid tackifier is non-reactive. Hence, an adhesive containing 100 parts elastomeric polymer, 110 parts of reactive liquid (diethylene-glycol ester of dehydroabietic acid) tackifier and 20 parts phenolic curing agent requires 40 seconds for curing at 350° F., and only a very short time at 420° F., e.g. 1 second.

Preferably, a reinforcing pigment is included in the adhesive composition to increase the adhesive strength thereof. Examples of fillers suitable for this purpose include zinc oxide, calcium carbonate, calcium hydroxide, etc. In addition to improving adhesive strength, the filler may in some cases also serve in promoting the reaction between the elastomeric polymer and the phenolic curing resin. In general, the filler is in an amount from 0 to 100 per 100 parts of the elastomeric polymer. If no such filler be present, it may be decided to add an accelerator, such as zinc resinate, for accelerating the curing operation. In general, the accelerator is present in an amount from 0 to 20 parts per 100 parts of elastomeric polymer. Conventional additives generally present in normally tacky and pressure-sensitive adhesives may be included in the adhesive mass of this invention such as softeners, plasticizers, antioxidants, etc.

In applying the adhesive to a backing different procedures may be used such as by solvent coating following a standard procedure and by calendering spreading. In applying the mass by solvent coating the following procedure is employed:

The mass is prepared by the conventional method. The elastomeric polymer, such as natural rubber, and the reinforcing pigments, such as zinc oxide, are combined in a Banbury mixer to form a base and this is then put in an internal mixer wherein the aldehyde resin curing and liquid tackifier are added slowly with mixing to blend them in. Finally, the mass is brought to coating state by solvent addition employing a suitable aromatic or aliphatic solvent such as toluene or heptane. Then the adhesive mass is removed from the mixer and coated on the backing, after which it is cured to the desired extent by heating the coated sheet in a conventional manner. If so desired the reaction need not be complete so that further advance may occur upon heating the adhesive tape at the time of application.

In another method of application, the adhesive is applied to the backing by means of calendering. In this method there is employed a large amount of liquid tackifier and a small amount of aldehyde resin curing agent together with the elastomeric polymer, fillers and conventional additives such as antioxidants, etc. Then the mass is cured prior to spreading. A recommended procedure for carrying out calendering is as follows:

The elastomeric polymer (100 parts) is charged into a cold Banbury mixer with neither steam nor cooling water on. When the elastomeric polymer has been mixed for about two minutes, a suitable antioxidant in a small amount (e.g., 4 parts) and a very small amount (e.g., 5 parts) of liquid tackifying resin are added and the resulting mixture is worked until a smooth mixture is obtained. This usually requires about four to six minutes. Then about 10 parts of liquid tackifying resin and a small amount of filler are added. The mixture is then allowed to mix until smooth. Then the liquid tackifying resin and filler are added in alternate additions adding about 20 parts of liquid tackifying resin at each addition. This is continued until about 100 parts liquid tackifying resin and all the filler have been smoothly blended in. Usually about 25 minutes is required. At this point, the aldehyde resin curing agent is added and the steam is turned on in the Banbury mixer. The temperature will rise uniformly to about 280–300° F. in about 15–20 minutes. At about 290° F. the temperature rate of rise will suddenly change and increase somewhat more rapidly than before. This indicates that curing has taken place. After curing the batch is discharged from the Banbury and then the remaining parts of the liquid tackifying resin (e.g., 50 parts) are added on an open mill. The resulting composition is now ready for calendering.

The attached table contains the formulations of various normally tacky and pressure-sensitive adhesives formed in accordance with this invention and, hence, including in the formulations varying amounts of elastomeric polymer, liquid tackifier compatible with the elastomeric polymer and in an amount to render the composition tacky and pressure-sensitive at normal temperature and an aldehyde resin curing agent in an amount sufficient to render the elastomeric polymer of the resulting composition when heated insoluble in conventional aromatic and aliphatic solvents. It should be pointed out that Examples 22–31 are examples of composition wherein the liquid tackifier is a liquid reactive tackifier.

*Masses with all liquid tackifiers*

|  | 1 | 2 | 3 | 4 | 5 | 6 | 7 | 8 | 9 |
|---|---|---|---|---|---|---|---|---|---|
| 1. Crude rubber | 33⅓ | 33⅓ | 33⅓ | 33⅓ | 33⅓ | 33⅓ | 33⅓ | 33⅓ | 33⅓ |
| 2. GRS 1022 | 66⅔ | | | | | | | | |
| 3. GRS 1501 | | 66⅔ | 66⅔ | | | | | | |
| 4. GRS 1002 | | | | | | | | | 66⅔ |
| 5. Vistanex B 100 | | | | 66⅔ | 66⅔ | 66⅔ | 66⅔ | 66⅔ | |
| 6. GRS 1006 | | | | | | | | | |
| 7. Paracril C | | | | | | | | | |
| 8. Hycar 4021 | | | | | | | | | |
| 9. Neoprene AC (soft) | | | | | | | | | |
| 10. Neoprene WRT | | | | | | | | | |
| 11. Zinc oxide | 58 | 58 | 58 | 37 | 115 | | | | 58 |
| 12. Magnesium oxide | | | | | | | 58 | | |
| 13. Aluminum hydrate | | | | | | | | 58 | |
| 14. Antioxidant | 2 | 2 | 2 | 2 | 2 | 2 | 2 | 2 | 2 |
| 15. Schenectady 517 | 60 | | | | | | | | |
| 16. Schenectady SP 1045 | | 20 | | | | | | | |
| 17. Amberol ST 137 | | | 50 | 20 | 14 | 14 | 20 | 20 | 20 |
| 18. Tetraethylene pentamine | | | | | | | | | |
| 19. Lanolin | | | | | | | | | |
| 20. Piccolyte S25 | 140 | | | | | | | | |
| 21. Piccolyte S10 | | 160 | 80 | 160 | 250 | 80 | 160 | 160 | 400 |
| 22. Staybelite ester #3 | | | 120 | | | | | | |
| 23. Polybutene #128 | | | | | | | | | |
| 24. Hercolyn | | | | | | | | | |
| 25. Abitol | | | | | | | | | |
| 26. Abalyn | | | | | | | | | |
| 27. Piccolyte S115 | | | | | | | | | |

*Masses with all liquid tacifiers*—Continued

|  | 10 | 11 | 12 | 13 | 14 | 15 | 16 | 17 | 18 | 19 | 20 | 21 |
|---|---|---|---|---|---|---|---|---|---|---|---|---|
| 1. Crude rubber | 80 | 33⅓ | 33⅓ | 33⅓ | 33⅓ | 33⅓ | 100 |  | 33⅓ | 33⅓ | 33⅓ | 33⅓ |
| 2. GRS 1022 |  | 66⅔ | 66⅔ | 66⅔ |  |  |  |  |  |  |  |  |
| 3. GRS 1501 |  |  |  |  |  |  |  | 100 |  |  |  |  |
| 4. GRS 1002 |  |  |  |  |  | 66⅔ |  |  |  |  |  |  |
| 5. Vistanex B 100 | 20 |  |  |  |  |  |  |  |  |  |  |  |
| 6. GRS 1006 |  |  |  |  | 66⅔ |  |  |  |  |  |  |  |
| 7. Paracril C |  |  |  |  |  |  |  |  | 66⅔ |  |  |  |
| 8. Hycar 4021 |  |  |  |  |  |  |  |  |  | 66⅔ |  |  |
| 9. Neoprene AC (soft) |  |  |  |  |  |  |  |  |  |  | 66⅔ |  |
| 10. Neoprene WRT |  |  |  |  |  |  |  |  |  |  |  | 66⅔ |
| 11. Zinc oxide | 58 | 58 | 58 | 58 | 58 | 58 | 58 | 58 | 58 | 58 | 58 | 58 |
| 12. Magnesium oxide |  |  |  |  |  |  |  |  |  |  |  |  |
| 13. Aluminum hydrate |  |  |  |  |  |  |  |  |  |  |  |  |
| 14. Antioxidant | 2 | 2 | 2 | 2 | 2 | 2 | 2 | 2 | 2 | 2 | 2 | 2 |
| 15. Schenectady 517 |  |  |  |  |  |  |  |  |  |  |  |  |
| 16. Schenectady SP 1045 |  |  |  |  |  |  |  |  |  |  |  |  |
| 17. Amberol ST 137 | 24 | 14 | 14 | 14 | 14 | 14 | 14 | 30 | 20 | 14 | 20 | 20 |
| 18. Tetraethylene pentamine |  |  |  |  |  |  |  |  |  | 4 |  |  |
| 19. Lanolin |  |  |  |  |  |  |  | 40 |  |  |  |  |
| 20. Piccolyte S25 |  |  |  |  |  |  |  | 150 |  |  |  |  |
| 21. Piccolyte S10 |  | 120 | 120 | 120 | 160 | 160 | 160 |  |  | 160 |  |  |
| 22. Staybelite ester #3 |  |  |  |  | 60 |  |  |  | 160 |  | 160 | 160 |
| 23. Polybutene #128 | 160 |  |  |  |  |  |  |  |  |  |  |  |
| 24. Hercolyn |  | 40 |  |  |  |  |  |  |  |  |  |  |
| 25. Abitol |  |  | 40 |  |  |  |  |  |  |  |  |  |
| 26. Abalyn |  |  |  | 40 |  |  |  |  |  |  |  |  |
| 27. Piccolyte S115 |  |  |  |  |  | 10 |  |  |  |  |  |  |

*Adhesives with reactive tackifiers*

|  | 22 | 23 | 24 | 25 | 26 | 27 | 28 | 29 | 30 | 31 |
|---|---|---|---|---|---|---|---|---|---|---|
| 1. Crude rubber | 50 | 50 | 50 | 50 | 50 | 50 | 25 | 75 |  | 75 |
| 2. GRS 1022 | 50 | 50 | 50 | 50 | 50 | 50 | 75 | 25 |  | 25 |
| 3. Neoprene AC (soft) |  |  |  |  |  |  |  |  | 100 |  |
| 4. "Amberol ST 137" (heat reactive phenolic resin) | 20 | 20 | 20 |  | 20 |  | 20 | 20 | 20 | 20 |
| 5. Zinc oxide | 60 | 60 | 60 | 60 | 60 | 60 | 60 | 60 | 60 | 60 |
| 6. Diethylene glycol ester of dehydroabietic acid | 110 |  |  | 110 |  | 110 | 180 | 60 | 120 | 250 |
| 7. Triethylene glycol ester dehydroabietic acid |  | 110 |  |  |  |  |  |  |  |  |
| 8. Neopentyl glycol ester of dehydroabietic acid |  |  | 110 |  |  |  |  |  |  |  |
| 9. Propyl glycol ester of dehydroabietic acid |  |  |  |  |  | 110 |  |  |  |  |
| 10. Antioxidants | 2 | 2 | 2 | 2 | 2 | 2 | 2 | 2 | 2 | 2 |
| 11. "Melmac 243–3" |  |  |  |  | 20 |  |  |  |  |  |
| 12. "Resimene" |  |  |  |  |  |  | 20 |  |  |  |

With respect to the foregoing examples, the following comments are made with respect to a number of the ingredients listed in the examples:

The "crude rubber" may be pale crepe or smoked sheet.

"GRS–1022" is a hot butadiene-styrene copolymer containing 23.5 bound styrene and a rosin acid emulsifier and has a Mooney viscosity of 78.

"GRS 1501" is a cold butadiene-styrene copolymer containing 20% bound styrene and a rosin acid emulsifier and has a Mooney viscosity of 54.

"Vistanex B–100" is a polymer of isobutylene having a molecular weight of 100,000.

"GRS 1006" is a butadiene-styrene copolymer containing 23.5% bound styrene and a fatty acid emulsifier and has a Mooney viscosity of 50.

"Paracril C" is a butadiene-acrylonitrile copolymer having a nitrile content of 35% and a Mooney viscosity of 80–90.

"Hycar 4021" is a Hycar polyacrylic rubber which is a copolymer of an acrylic acid ester and a halogen-containing derivative.

"Neoprene AC soft" is a non-sulfur modified chloroprene polymer stabilized by a thiouram disulfide.

"Neoprene WRT" is a stabilized polymerized chloroprene having a Mooney plasticity of 0.120 inches at 176° F.

"Schenectady 517" is a heat reactive phenol-formaldehyde type of a resin formed by reacting mixed meta xylenols and formaldehyde under alkaline conditions. It has a softening point of 70° C.

"Schenectady SP–1045" is a heat reactive, oil soluble, para octyl phenol-formaldehyde type resin in powder form having a softening point of 85° C.

"Amberol ST–137" is a heat reactive, oil soluble phenolic resin made from reacting one mole of para octyl phenol and at least one and one-half moles formaldehyde under alkaline conditions and reacted to a softening point of 85° C.

"Piccolyte S–25," "Piccolyte S–10" and "Piccolyte S–115" are terpene resins which are polymers of beta pinene.

"Staybelite Ester No. 3" is a pale colored, thermoplastic, acid resin made by hydrogenating wood rosin.

"Polybutene #128" is a product of catalytic polymerization of normal and branched chain butenes.

"Hercolyn" is hydrogenated methyl ester of rosin.

"Abitol" is hydroabietyl alcohol.

"Abalyn" is methyl ester of rosin.

In the formation of pressure-sensitive adhesive tapes employing the improved adhesives of this invention the adhesive 2 (see the accompanying drawing) may be applied in a suitable manner, such as by solvent coating or calendering discussed hereinbefore in detail to any conventional backing 1 for such tapes such as paper, cloth, non-fibrous films (e.g. cellophane, vinyl resins, polyethylene, etc.) etc. For example, suitable tapes may be prepared by solvent coating each of the adhesive masses shown in the foregoing table on a 27 pound paper (24 x 36 x 480) impregnated 85% of its weight with an impregnant (75 parts Hycar OR–25:25 parts C.R.S. (50 butadiene:50 styrene) at a coating weight of 1.5 ounces sq. yd. If desired the backing may be provided with a suitable conventional priming coating to improve the adherence of the adhesive thereto. Suitable primer coatings are those exemplified in the patent to Bemmels, No. 2,647,843, issued August 4, 1953.

The invention in its broader aspects is not limited to the specific steps, methods, compositions, combinations and improvements shown and described but departures may be made therefrom within the scope of the accom- This application is a continuation-in-part of applications Ser. No. 611,911, filed September 25, 1956, abandoned and Ser. No. 703,027, filed December 16, 1957, abandoned.

What is claimed is:

1. A normally tacky and pressure-sensitive adhesive tape having improved "quick-stick" and cohesive characteristics comprising a flexible backing coated on at least one major surface thereof with an adhesive comprising a curable elastomeric polymer, a liquid tackifier in an amount from about 25 to about 500 parts per hundred parts of the elastomeric polymer, and an aldehyde resin curing agent soluble in the elastomeric polymer and selected from the group consisting of heat reactive phenol-formaldehyde resins, urea-formaldehyde resins and melamine-formaldehyde resins in an amount from about 5 to about 75 parts per hundred parts of elastomeric polymer, said liquid tackifier being in an amount at least equal to that of the aldehyde resin curing agent.

2. A normally tacky and pressure-sensitive adhesive tape according to claim 1, wherein the liquid tackifier has a melting point of below about 25° C.

3. A normally tacky and pressure-sensitive adhesive tape according to claim 1, wherein the aldehyde curing agent is a phenol-formaldehyde resin.

4. A normally tacky and pressure-sensitive adhesive tape according to claim 1, wherein the liquid tackifier is a reactive tackifier.

5. A normally tacky and pressure-sensitive adhesive tape according to claim 1, wherein the aldehyde curing agent is a urea-formaldehyde resin.

6. A normally tacky and pressure-sensitive adhesive tape according to claim 1, wherein the aldehyde curing agent is a urea-formaldehyde resin and the liquid tackifier is a reactive tackifier.

7. A normally tacky and pressure-sensitive adhesive tape according to claim 1, wherein the aldehyde curing agent is a melamine-formaldehyde resin.

8. A normally tacky and pressure-sensitive adhesive tape according to claim 1, wherein the aldehyde curing agent is a melamine-formaldehyde resin and the liquid tackifier is a reactive tackifier.

9. A normally tacky and pressure-sensitive adhesive tape according to claim 1 wherein the aldehyde curing agent is a phenol-formaldehyde resin and the liquid tackifier is a reactive tackifier.

10. A normally tacky and pressure-sensitive adhesive tape according to claim 9, wherein the liquid reactive tackifier is selected from the group consisting of diethylene glycol ester of dehydroabietic acid, triethylene glycol ester of dehydroabietic acid, neopentyl glycol ester of dehydroabietic acid and propyl glycol ester of dehydroabietic acid.

11. The method of manufacturing a normally tacky and pressure-sensitive adhesive tape of improved "quick-stick" and cohesive characteristics which comprises coating on at least one major surface of a flexible backing an adhesive composition comprising a curable elastomeric polymer, a liquid tackifier in an amount from about 25 to about 500 parts per hundred parts of the elastomeric polymer, and an aldehyde resin curing agent soluble in the elastomeric polymer and selected from the group consisting of heat reactive phenol-formaldehyde resins, urea-formaldehyde resins and melamine-formaldehyde resins in an amount from about 5 to about 75 parts per hundred parts of elastomeric polymer, said liquid tackifier being in an amount at least equal to that of the aldehyde resin curing agent.

12. The method of manufacturing a normally tacky and pressure-sensitive adhesive tape according to claim 11 wherein the adhesive is applied to the backing by dissolving the adhesive in a suitable solvent to form a solvent coating, coating the solvent coating on a backing and heating the coated backing to remove the solvent and cure the adhesive.

13. The method of manufacturing a normally tacky and pressure-sensitive adhesive tape according to claim 11 wherein the adhesive components are blended together and heated to form a cured adhesive mass and subsequently calendering spreading the cured adhesive on a backing.

No references cited.